United States Patent [19]

Carrier

[11] Patent Number: 5,294,775
[45] Date of Patent: Mar. 15, 1994

[54] THERMOSTATICALLY CONTROLLED ELECTRICALLY HEATED STEERING WHEEL COVER ASSEMBLY

[76] Inventor: Claude Carrier, 122 Arsene, Longueuil, Quebec, J4G 1N2, Canada

[21] Appl. No.: 848,343

[22] Filed: Mar. 9, 1992

[51] Int. Cl.⁵ .......................... H05B 1/02; H05B 3/54; B62D 1/06
[52] U.S. Cl. ..................................... 219/204; 74/558; 74/558.5; 219/528; 219/535; 219/536
[58] Field of Search ............... 219/204, 535, 200, 201, 219/202, 528, 536; 74/558, 558.5

[56] References Cited

U.S. PATENT DOCUMENTS

| | | | |
|---|---|---|---|
| 2,018,947 | 10/1935 | Claridge | 219/204 |
| 2,392,539 | 1/1946 | Leible | 219/204 |
| 2,530,559 | 11/1950 | Wilson | 219/204 |
| 2,537,606 | 1/1951 | Steppan | 219/204 |
| 2,662,961 | 12/1953 | Sargent | 219/204 |
| 2,812,412 | 11/1957 | Fulham | 219/204 |
| 3,165,620 | 1/1965 | Miller | 219/204 |
| 4,549,069 | 10/1985 | Oge | 219/204 |

*Primary Examiner*—Anthony Bartis
*Attorney, Agent, or Firm*—Watson, Cole, Grindle & Watson

[57] ABSTRACT

A steering wheel cover assembly includes an electric heating element for electrically heating the wheel and hands of the vehicle driver. The assembly includes a pair of structural elements. One of the structural elements is rotatable in association with the steering wheel, and the other structural element is in a fixed position. The two structural elements have electrical contacts which maintain contact during rotation of the steering wheel. The first and second structural elements are formed of at least two members secured together by mechanical fastening means to permit easy assembly and removal of the structural elements. The assembly also includes means for electrically connecting the electrical contacts of the structural element having a fixed position to a power supply means. An electric circuit having, in series, a switch and a thermostat for sensing the temperature of the steering wheel connects the heating element to the contacts of the rotatable structural element.

12 Claims, 6 Drawing Sheets

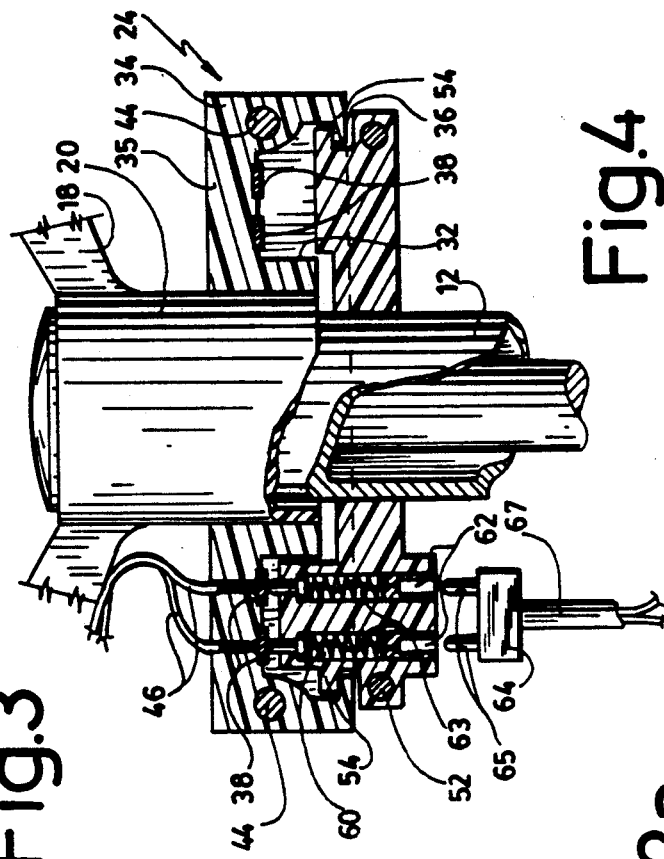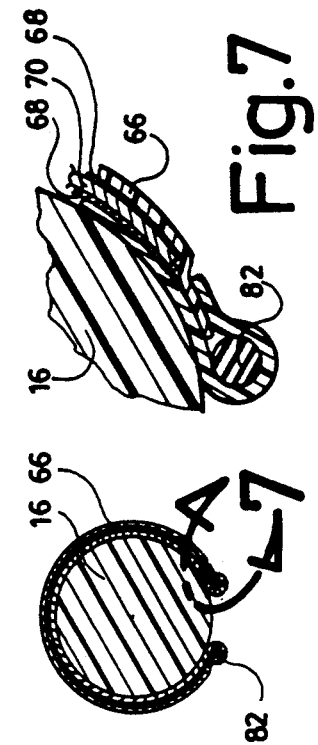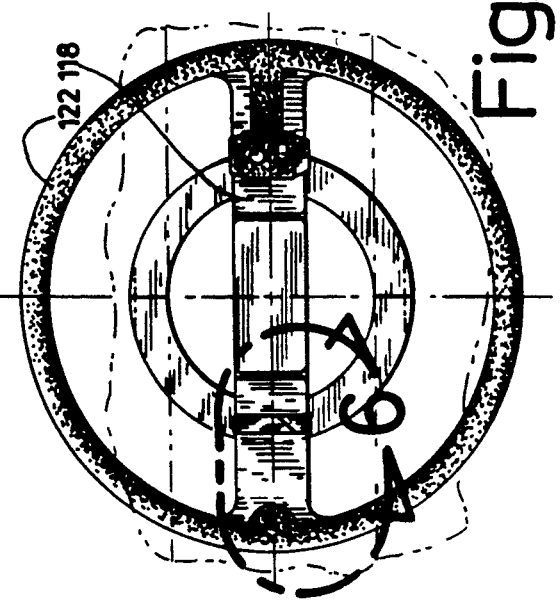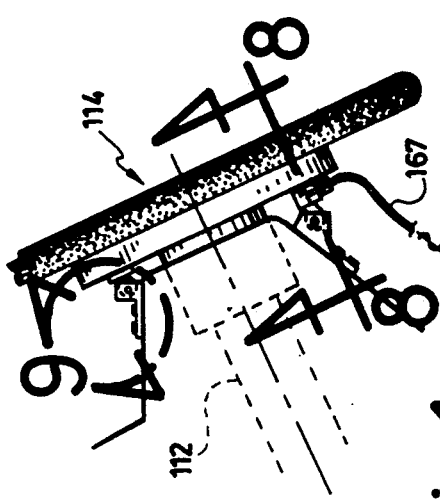

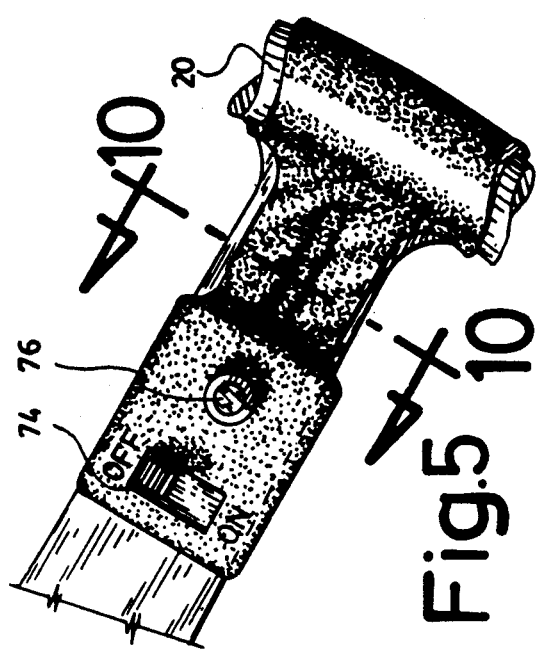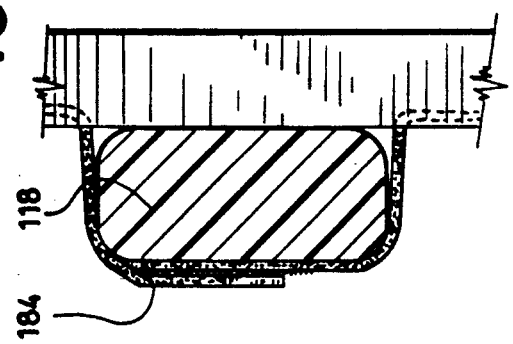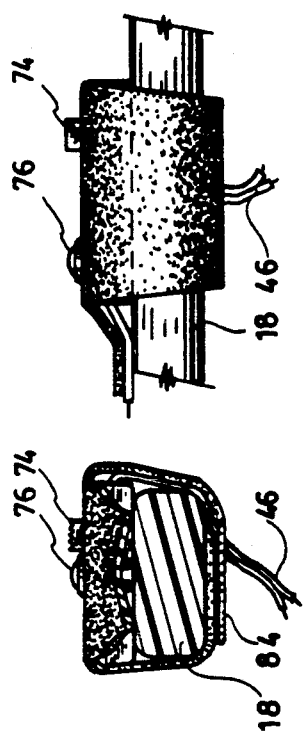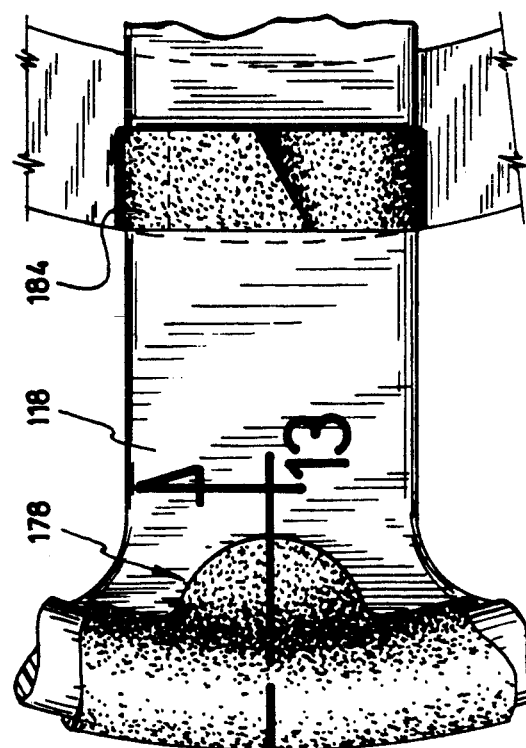

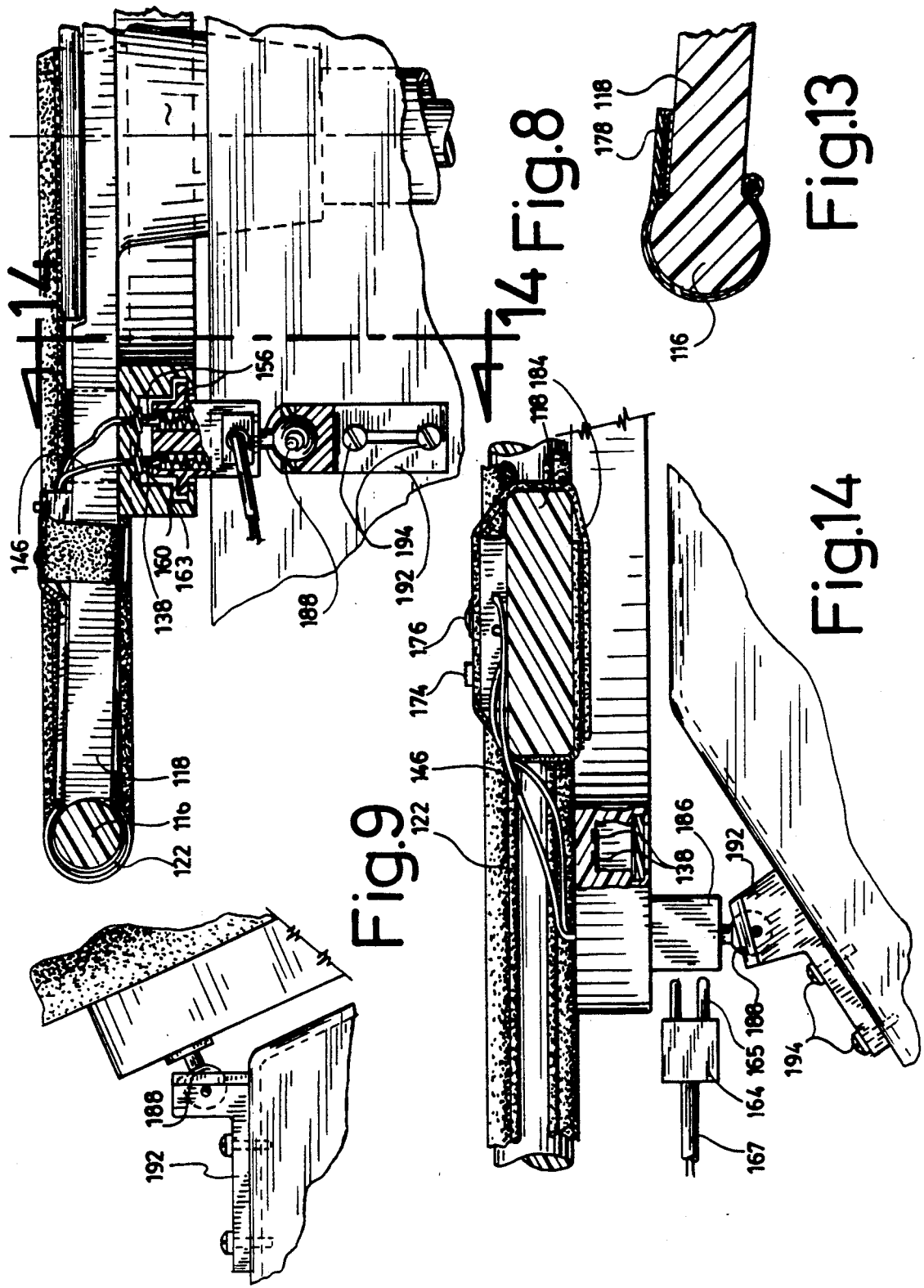

THERMOSTATICALLY CONTROLLED ELECTRICALLY HEATED STEERING WHEEL COVER ASSEMBLY

The present invention relates to a steering wheel cover and more particularly to a cover adapted to heat the steering wheel of a vehicle.

The steering wheel of a vehicle such as an automobile or truck can, in a Northern climate during the winter months, become sufficiently cold so as to cause discomfort to the driver of the vehicle. Even after the vehicle itself has warmed up, the steering wheel usually remains cold to the touch necessitating the wearing of gloves by the driver.

It has been proposed previously in the art to provide means for heating the steering wheels of vehicles and a variety of different proposals ranging from the use of hot air, heated coolants and electric resistance heating have been advanced. Some of these proposals have included the provision of heating elements as an integral part of the steering wheel; however, automotive manufacturers have not incorporated this provision into their automobiles. While there have also been a number of proposals which can be used as a retrofit device, these have not gained any wide acceptance by the public.

It is an object of the present invention to provide a steering wheel cover assembly which incorporates heating means and which assembly can be adapted to many different types of vehicles and steering wheels.

Generally, according to one aspect of the present invention, there is provided a steering wheel cover assembly, the steering wheel cover assembly comprising a cover member, an electrical resistance heating means associated with the cover member, a first structural element securable to a rotatable portion of a steering wheel assembly, electrical contact means associated with the first structural element, a second structural element securable to a non-rotatable portion of the vehicle approximate the steering wheel, the second element also having electrical contact means associated therewith, both of the first and second structural elements being juxtaposed to each other such that the electrical contact means of the first element and the electrical contact means of the second element are in electrical communication when the first element rotates, electrical power supply means associated with the second structural element, thermostat means for sensing and controlling the temperature of the cover member, and switch means for turning electric power to the heating means on and off.

In greater detail, the assembly of the present invention includes a steering wheel cover member having an exterior surface which may be formed of many different suitable materials providing the desired feel and esthetic appeal. Many different natural and/or synthetic materials or combinations thereof which are known in the art have been employed with conventional wheel covers and can be used with the present invention. Desirably, the material is of a somewhat resilient nature and has a suitable feel.

The steering wheel cover is preferably of a multilayer construction and as discussed hereinbelow, includes resistance type heating means. The combination of different layers of material having different properties such as both electrical and thermal insulating properties is well known in the art and many such structures may be utilized.

Associated with the cover material is an electrical heating means of the electrical resistance type. The means of incorporation of the heating means and the particular type used may be selected from those well known to those knowledgeable in the art. Many different types are commercially available. The cover member may be secured to the wheel by any suitable and conventional attachment means including draw strings, removable and/or permanent fasteners, etc.

The assembly will include means for regulating the heat supplied to the cover member such that when a desired temperature is obtained, the unit will cease heating. There are many different types of thermostats which can be utilized; one of the easiest and most inexpensive would be the use of a bi-metal thermostat which is located on the steering wheel rim or close thereto in order to sense the temperature of the rim.

A switch device is also preferably included in the assembly and provides means for turning the assembly on and/or off as desired and/or required. In this respect, the circuitry is very basic and suitable power leads are supplied as will be discussed in greater detail with respect to the preferred embodiment of the invention.

The assembly includes first and second structural elements which permit a continuous supply of power to the heating means irrespective of the rotational movement of the steering wheel.

The first structural element is adapted to be secured to a rotatable portion of the steering wheel assembly such that it will rotate with the turning of the steering wheel. The point of attachment will depend upon the particular type of steering wheel involved; in a relatively straightforward arrangement, the first structural element may be secured to the hub of the steering wheel which is usually formed integrally with the rim and spoke portions. When this is not suitable, it may be attached to the steering wheel rim and spoke themselves. It will be understood that many suitable forms of attachment may be utilized; in the simplest form, the first structural element is formed in two parts (two halves) to provide for ready assembly of the same about the hub of the steering wheel assembly. Mechanical fastening means such as bolts or clips may be provided. Alternatively, straps or a more permanent securement by adhesive means or mechanical fasteners may be utilized.

The first structural element, being secured to the rotatable portion of the steering wheel assembly, will provide electrical communication to the electric heating means of the steering wheel cover. The first structural element will also provide electrical contact means for receiving power from the second structural element. In this respect a conventional 12 volt direct current heating which draws power from the vehicle's electric circuit may be employed.

The second structural element is designed to be juxtaposed to the first structural element and is adapted to be fixed to a non rotatable portion of either the steering wheel assembly or a surrounding portion of the vehicle. The second structural element is designed to provide electrical contact means which will remain in electrical communication with the electric contact means of the first structural element. The arrangement is such that rotatable movement of the steering wheel and first structural element will permit electrical contact between the two different electric contact means at all positions of the steering wheel. To maintain electrical contact, one of the contact means may be biased or other spring means may e used. In turn, the electrical contact means of the second structural element will receive DC power from a suitable source of the same - it may be directly wired to one of the vehicle circuits or alternatively, there may be provision for drawing power from an accessory outlet such as the cigarette lighter.

Having thus generally described the invention, reference will be made to the accompanying drawings illustrating an embodiment thereof, in which:

FIG. 1a is a view similar to FIG. 1 showing a further embodiment of a heated cover assembly for a steering wheel;

FIG. 2a is a front view of the assembly of FIG. 1a;

FIG. 3 is a cross sectional view taken along the line 3—3 of FIG. 2,

FIG. 4 is a sectional view taken along the lines 4—4 of FIG. 2;

FIG. 5 is a detailed view of the switch portion indicated by arrow 5 of FIG. 2;

FIG. 6 is a detailed view of that portion of FIG. 2a indicated by arrow 6;

FIG. 7 is a detailed view of that portion of FIG. 3 indicated by arrow 7;

FIG. 8 is a cross sectional view taken along the lines 8—8 of FIG. 1a;

FIG. 9 is a detailed view of that portion of FIG. 1a indicated by arrow 9;

FIG. 10 is a sectional view taken the lines 10—10 of FIG. 5;

FIG. 11 is a side view of FIG. 10;

FIG. 12 is a sectional view taken from the right side of FIG. 6 showing attachment of the cover member;

FIG. 13 is a sectional view taken along the lines 13—13 of FIG. 6;

FIG. 14 is sectional view taken along the line 14—14 of FIG. 8;

FIG. 16 is a perspective view illustrating assembly of the structural components of the embodiment of FIG. 1a;

Figure 2:
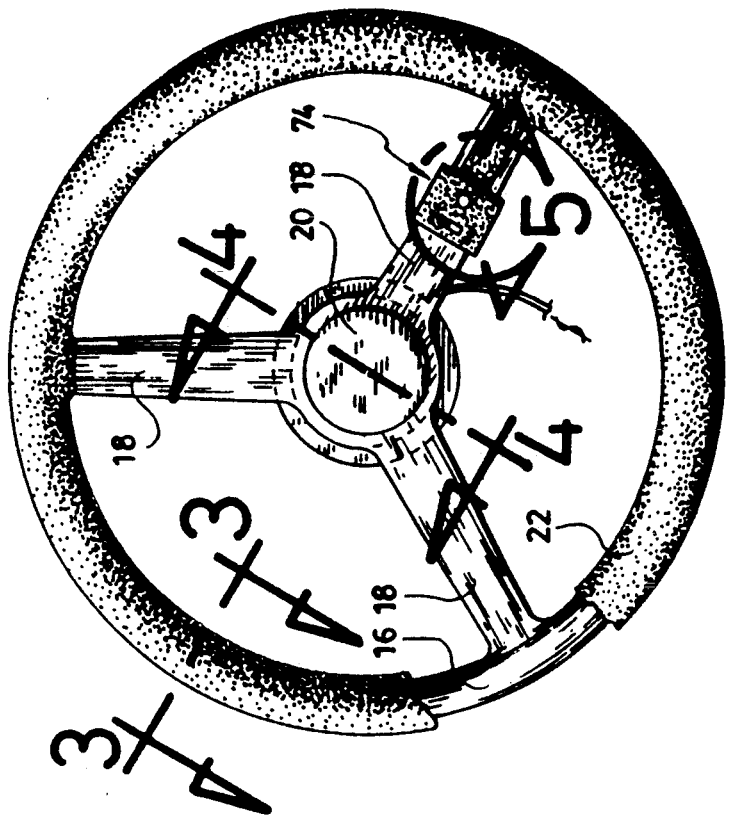
FIG. 2 is a front view of the assembly of FIG. 1.
Figure 1:
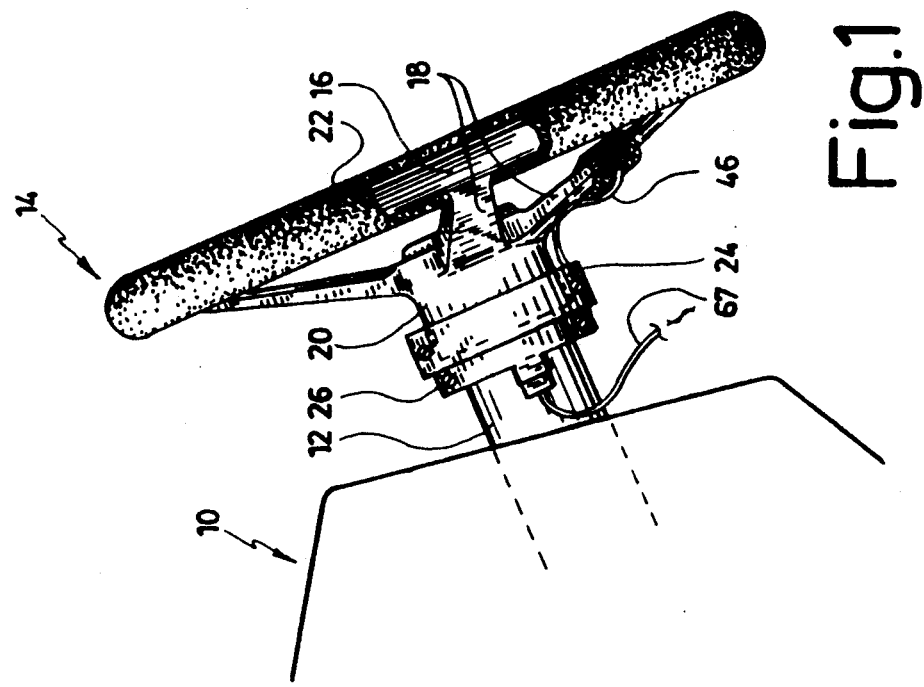
FIG. 1 is a side elevational view of a steering wheel having the heated cover assembly according to the present invention.

Referring to the drawings in greater detail, and by reference characters thereto, FIGS. 1 and 2 illustrate a first embodiment of a steering wheel cover assembly. As shown, there is provided a conventional automobile steering wheel 14 mounted on a post 12 extending through dash 10. Steering wheel 14 includes a rim portion 16 having spokes 18 extending to a hub 20 in a substantially conventional arrangement. The steering wheel cover 22 is placed over the rim 16 as illustrated.

The device or assembly includes a first structural element which is generally designated by reference numeral 24 and a second structural element 26. These elements are illustrated in greater detail in FIG. 15 and reference may be had thereto. As shown, first structural element 24 is made up of two similar halves 28 and 30; apertures 42 permit the securing together of halves 28 and 30 by means of machine screws 44. Each half is similar and reference will be made to half 30 which is formed to have an inside wall 32 and an outside wall 34 with a top wall 35 extending therebetween. On outside wall 34 there is provided an inwardly extending flange 36. A pair of contact strips 38 extend continuously along the interior surface of top wall 35 with a pair of electrical wires or leads 46 extending therefrom.

Figure 15:
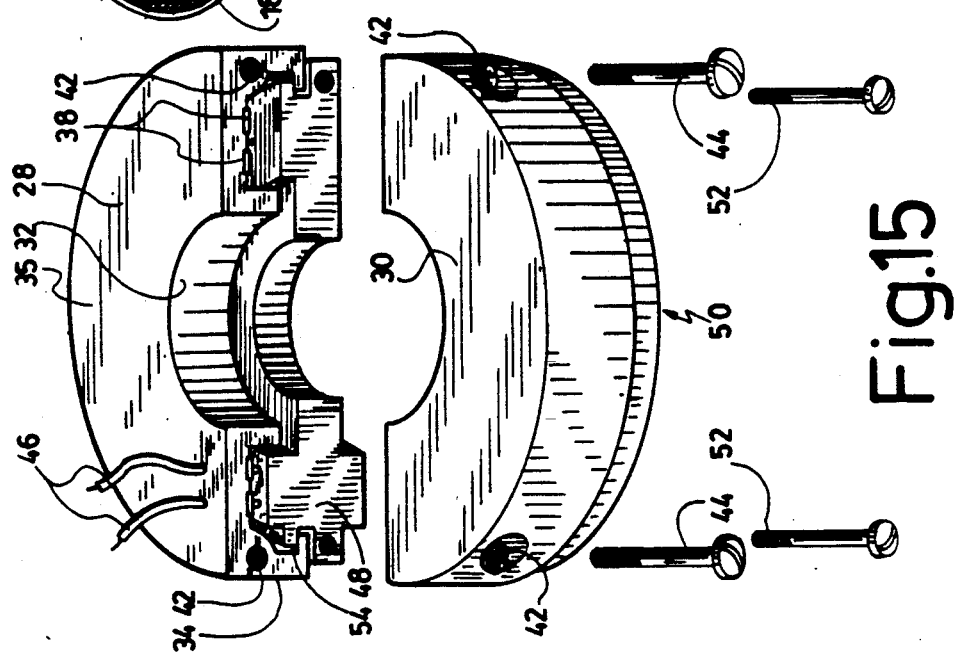
FIG. 15 is a perspective view showing assembly of the structural components of the embodiment of FIG. 1.

Second structural element 26 is also shown in FIG. 15 and like first structural element 24, is composed of two similar halves 48 and 50. Halves 48 and 50 are secured together by machine screws 52. An outwardly extending flange 54 extends circumferentially outwardly to engage in a locking relationship with flange 36 of first structural element 24 such that the two structural elements 24 and 26 may be secured together in an operational position. As may be best seen in FIG. 4, a pair of contact elements 56 are provided for maintaining electrical contact or communication with contact strips 38 of first structural element 24. In this respect, contact elements 56 are urged into physical contact with contact strips 38 by means of springs 60 which are retained in position by retaining members 62. Electrical wires 63 maintain electrical communication between contact elements 56 and a portion of retaining member 62 such that when a plug member 64 is inserted, electrical current can flow from current carrying wires 67 to prongs 65 of plug 64 through electrical wires 63 and contact elements 56 to contact strips 38 which are in electrical communication with wires or leads 46.

The cover member 22, as may be best seen in FIGS. 3 and 7, includes an inner layer 70 of an electrical resistance heating material with insulating layers 68 on either side of heating layer 70. Outer layers 66 provide the finishing material and may be similar to dissimilar—they may be selected from synthetic material or a material such as leather.

As may be seen in FIGS. 2, 5, 10 and 11, there is provided an on/off switch 74 along with a suitable light 76 to indicate when the unit is heating. A thermostat 78 (shown in FIG. 19) senses the temperature proximate the rim and controls the current being supplied to the resistant heating layer 70. Thermostat 78 may be of any conventional type such as a bi-metal thermostatic device.

For installation, the cover member is provided with an elastic member 82 retained by the outer layers 66 as shown in FIG. 7. The portion housing the switch 74 and light 76 may be retained by means of straps 84 which may have a hook and eye type of attachment such as that which is marketed under the trademark "VELCRO".

A modified arrangement is illustrated in FIGS. 1a, 2a, 6, 8, 9, 12, 14 and 16 and reference will be made thereto. Similar reference numbers in the hundreds are employed for similar type components.

This embodiment is useful wherein the steering column is does not provide sufficient room for the previously described embodiment such as the case of certain tilt steering wheels and other similar arrangements.

In this embodiment, steering wheel 114 which is attached to post 112 has a rim portion 116 and spokes 118 connected to a hub 120. Cover member 122 is placed about rim 116.

Figure 16:
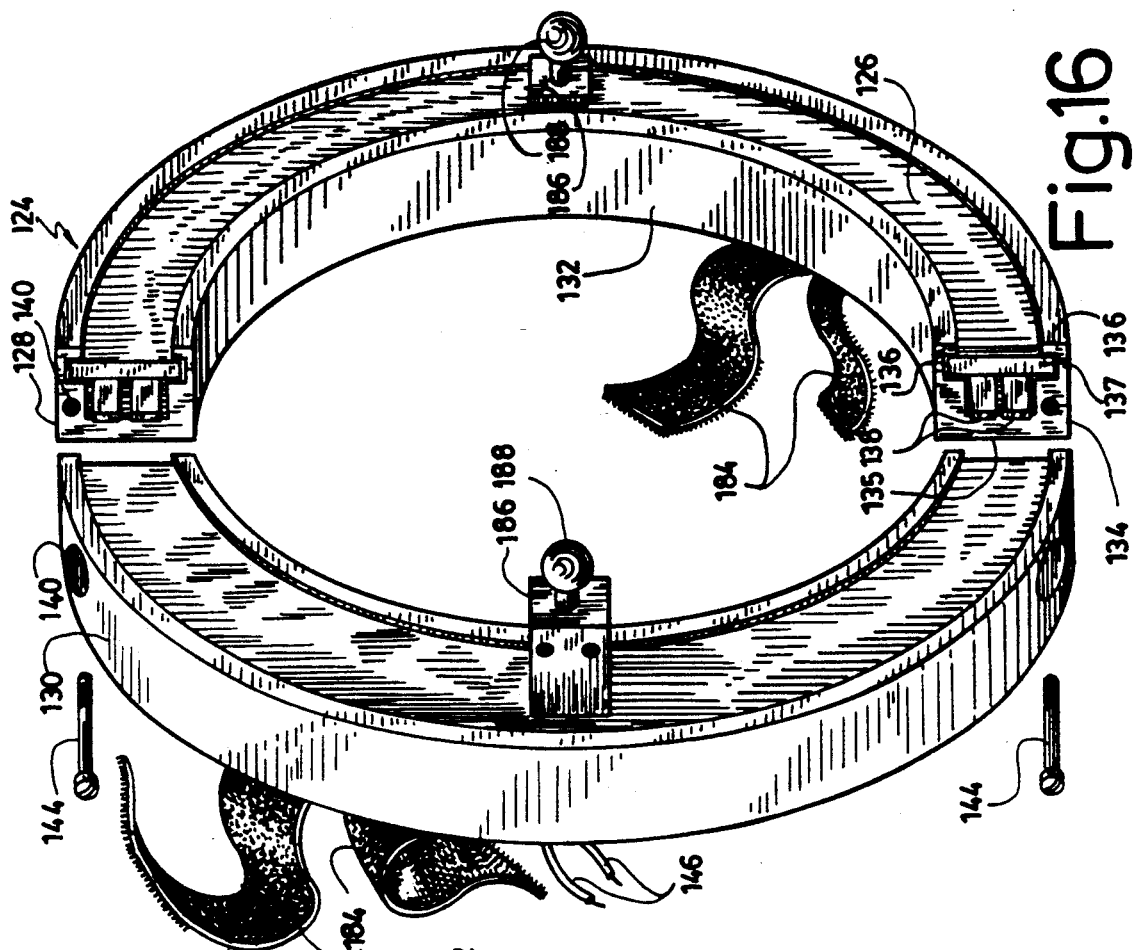

As shown in FIG. 16, there is provided a first structural element 124 which includes halves 128 and 130. Inside walls 132 and 134 are connected by a top wall 135; an inwardly extending flange 136 is provided on Outside wall 134. A pair of electric contact strips 138 are provided on the inside surface of top wall 135. Halves 128 and 130 are connected by machine screws 144 and a pair of leads 146 extend from contact strips 138.

Second structural element 126 mates with first structural element 124 as may best be seen in FIGS. 8 and 16 and is retained by a pair of flanges 136 and 137. In a manner similar to the first embodiment, there are provided a pair of contact elements 156 which are retained in position by springs 160 with electric wires 163 extending therefrom.

As may be seen from FIG. 16, second structural element 126 has a pair of mounting brackets 186 extending outwardly therefrom; mounting bracket 186 includes a ball 188 which fits within a socket formed within bracket 192. Bracket 192 is secured to a portion of the steering wheel assembly by screws 194 as shown in FIG. 14. Thus, the ball and socket arrangement shown provides for movement of the steering wheel and associated components.

In this embodiment, straps 184 are provided for securing the cover member 122 to the steering wheel.

Figures 17, 18, 19:
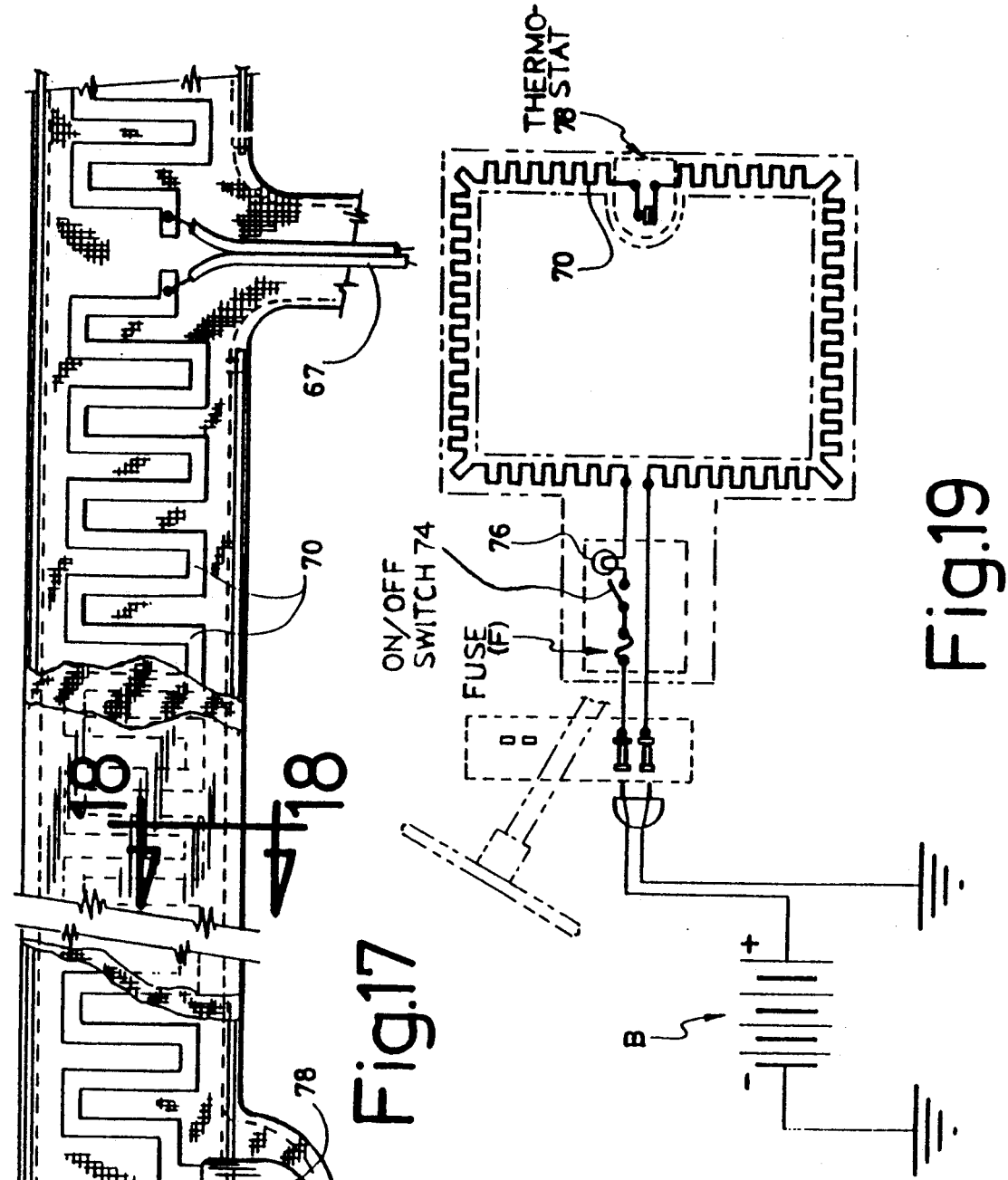
FIG. 17 is a detailed view illustrating a portion of the cover assembly and heating element thereof.
FIG. 18 is a sectional view taken along the line 18—18 of FIG. 17.
FIG. 19 is an electrical schematic of the arrangement.

As may be seen from FIGS. 17 and 19, wires 67 are in electrical communication with heating layer 70 which includes a thermostat 78 and a fuse member F. Power is supplied from the vehicle battery B.

It will be seen that the above arrangements provide for a heated steering wheel cover assembly which is both easy to install and easy to take off when not required—i.e. during the summer season. It can easily be installed by the vehicle owner and does not require special tools. There is no need to remove the steering wheel to permit installation of the same.

It will be understood that the above described embodiments are for purposes of illustration only and that changes and modifications may be made thereto without departing from the spirit and scope of the invention.

I claim:

1. An assembly for the heating of a steering wheel of a vehicle comprising a cover member, means for securing said cover member to a steering wheel, said cover member having electrical resistance heating means associated therewith, a first structural element adapted to be secured to a rotatable portion of a steering wheel assembly, electrical contact means associated with said first structural element, a second structural element securable to a non-rotatable portion of the vehicle and in a rotatable mating relationship with the first structural element, said second structural element also having electric contact means, said first and second elements being juxtaposed such that said electrical contact means of said first and second structural elements are in slidable electrical communication at all times, each of said first and second structural elements being formed of at least two members secured together by mechanical fastening means to permit easy assembly and removal of said structural elements, means for electrically connecting said electric contact means of said second structural element to a power supply means, and electric circuit means including, in series, switch means and thermostat means for sensing the temperature of the steering wheel operatively connected to said electrical resistance heating means and said electrical contact means of said first structural element.

2. The assembly of claim 1, wherein said cover member is of a multi-layer structure having an inner layer of an electrical resistance heating element comprising said electrical resistance heating means, a layer of electrically insulating material on either side of said heating means, and an outer layer of a resilient material.

3. The assembly of claim 1, wherein said electrical contact means associated with said first structural element comprise a pair of electrical strips arranged in a circular configuration, said electrical contact means of said second structural element comprising a pair of contact elements urged in slidable engagement with said electric contact strips by spring means.

4. The assembly of claim 3, further including electrical switch means for turning on and off the power to said electrical resistance heating means.

5. The assembly of claim 1, wherein said second structural element includes means for receiving power from a DC power source.

6. The assembly of claim 5, wherein said DC power source comprises the power supply of the vehicle.

7. The assembly of claim 1, wherein said first structural element is adapted to be secured to a hub portion of the vehicle steering wheel, said hub portion being rotatable with the steering wheel, and said second structural element is adapted to be secured to a non-rotatable portion of the steering wheel assembly.

8. The assembly of claim 1, wherein said first and second members are rotatably secured together by an interlocking flange arrangement on each of said structural elements.

9. The assembly of claim 1, wherein said second structural element includes a first portion adapted to be fixedly secured to a non-rotatable portion of the vehicle, said first portion having a socket member, and a second portion having a ball adapted to fit within said socket such that said second portion is moveable with respect to said first portion.

10. An assembly for the heating of a steering wheel of a vehicle comprising a cover member, means for securing said cover member to a steering wheel, said cover member having electrical resistance heating means associated therewith, a first structural element adapted to be secured to a rotatable portion of a steering wheel assembly, electrical contact means associated with said first structural element, a second structural element securable to a non-rotatable portion of the vehicle and in a rotatable mating relationship with the first structural element, said second structural element also having electric contact means, said first and second elements being juxtaposed such that said electrical contact means of said first and second structural elements are in slidable electrical communication at all times, said first and second elements being secured together by an interlocking flange arrangement on each of said elements, means for electrically connecting said electric contact means of said second structural element to a power supply means and electric circuit means including, in series, switch means and thermostat means for sensing the temperature of the steering wheel, operatively connected to said electrical resistance heating means and said electrical contact means of said first structural element.

11. The assembly of 10, wherein said second structural element includes a first portion adapted to be fixedly secured to a non-rotatable portion of the vehicle, said first portion having a socket member, and a second portion having a ball adapted to fit within said socket such that said second portion is moveable with respect to said first portion.

12. An assembly for the heating of the steering wheel of a vehicle comprising a cover member, means for securing said cover member to a steering wheel, said cover member having electrical resistance heating means associated therewith, a first structural element adapted to be secured to a rotatable portion of a steering wheel assembly, electrical contact means associated with said first structural element, a second structural element securable to a non-rotatable portion of the vehicle and in a rotatable mating relationship with the first structural element, said structural element also having electric contact means, said first and second elements being juxtaposed such that said electrical contact means of said first and second structural elements are in slidable electrical communication at all times, means for electrically connecting said electric contact means of said second structural element to a power supply means, and electric circuit means including, in series, switch means and thermostat means for sensing the temperature of the steering wheel, operatively connected to said electrical resistance heating means and said electrical contact means of said first structural element, said second structural element having a first portion thereof adapted to be fixedly secured to a non-rotatable portion of the vehicle, said first portion having a socket member, and a second portion having a ball adapted to fit within said socket such that said second portion is moveable with respect to said first portion.

* * * * *